US007804254B2

(12) United States Patent
Yao et al.

(10) Patent No.: US 7,804,254 B2
(45) Date of Patent: Sep. 28, 2010

(54) METHOD AND CIRCUIT FOR SHORT-CIRCUIT AND OVER-CURRENT PROTECTION IN A DISCHARGE LAMP SYSTEM

(75) Inventors: Kaiwei Yao, Santa Clara, CA (US); James C. Moyer, San Jose, CA (US); Wei Chen, Campbell, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 923 days.

(21) Appl. No.: 11/407,599

(22) Filed: Apr. 19, 2006

(65) Prior Publication Data

US 2007/0247085 A1 Oct. 25, 2007

(51) Int. Cl.
*H05B 37/02* (2006.01)
*H02H 7/122* (2006.01)

(52) U.S. Cl. ..................... 315/291; 315/307; 363/56.05

(58) Field of Classification Search ............. 315/209 R, 315/224, 241, 291, 307, 209 CD, 223, 241 R, 315/245, 276, 349, 355, 361; 363/56.01, 363/56.03–56.05, 56.08, 74
See application file for complete search history.

(56) References Cited

U.S. PATENT DOCUMENTS

| | | | | |
|---|---|---|---|---|
| 5,528,192 | A | 6/1996 | Agiman et al. | |
| 5,615,093 | A | 3/1997 | Nalbant | |
| 5,619,402 | A | 4/1997 | Liu | |
| 5,757,173 | A | 5/1998 | Agiman | |
| 5,841,239 | A * | 11/1998 | Sullivan et al. | 315/219 |
| 5,892,336 | A | 4/1999 | Lin et al. | |
| 5,923,129 | A | 7/1999 | Henry | |
| 5,930,121 | A | 7/1999 | Henry | |
| 6,104,146 | A | 8/2000 | Chou et al. | |
| 6,198,234 | B1 | 3/2001 | Henry | |
| 6,198,245 | B1 | 3/2001 | Du et al. | |
| 6,259,615 | B1 | 7/2001 | Lin | |
| 6,307,765 | B1 | 10/2001 | Choi | |
| 6,396,722 | B2 | 5/2002 | Lin | |
| 6,459,602 | B1 | 10/2002 | Lipcsei | |
| 6,469,922 | B2 | 10/2002 | Choi | |
| 6,480,043 | B2 * | 11/2002 | Hall et al. | 327/108 |
| 6,501,234 | B2 | 12/2002 | Lin et al. | |
| 6,507,173 | B1 | 1/2003 | Spiridon et al. | |
| 6,515,881 | B2 | 2/2003 | Chou et al. | |
| 6,531,831 | B2 | 3/2003 | Chou et al. | |
| 6,559,606 | B1 | 5/2003 | Chou et al. | |
| 6,570,344 | B2 | 5/2003 | Lin | |
| 6,654,268 | B2 | 11/2003 | Choi | |
| 6,657,274 | B2 | 12/2003 | Comeau et al. | |
| 6,756,769 | B2 | 6/2004 | Bucur et al. | |
| 6,781,325 | B2 | 8/2004 | Lee et al. | |
| 6,809,938 | B2 | 10/2004 | Lin et al. | |
| 6,853,047 | B1 | 2/2005 | Comeau et al. | |
| 6,856,519 | B2 | 2/2005 | Lin et al. | |
| 6,864,669 | B1 | 3/2005 | Bucur | |

(Continued)

*Primary Examiner*—Douglas W Owens
*Assistant Examiner*—Jimmy T Vu
(74) *Attorney, Agent, or Firm*—Perkins Coie LLP

(57) ABSTRACT

The method and circuit of the present invention provides short-circuit detection and protection in a discharge lamp system. The transformer's primary current is sensed and used to provide short-circuit protection of the secondary winding side or high voltage side. The system and method with the present invention provides short-circuit detection and protection even when the transformer's secondary winding is shorted.

26 Claims, 4 Drawing Sheets

U.S. PATENT DOCUMENTS

| | | | |
|---|---|---|---|
| 6,870,330 | B2 | 3/2005 | Choi |
| 6,873,322 | B2 | 3/2005 | Hartular |
| 6,876,157 | B2 | 4/2005 | Henry |
| 6,888,338 | B1 | 5/2005 | Popescu-Stanesti et al. |
| 6,897,698 | B1 | 5/2005 | Gheorghiu et al. |
| 6,900,993 | B2 | 5/2005 | Lin et al. |
| 6,906,497 | B2 | 6/2005 | Bucur et al. |
| 6,936,975 | B2 | 8/2005 | Lin et al. |
| 6,946,806 | B1 | 9/2005 | Choi |
| 6,979,959 | B2 | 12/2005 | Henry |
| 6,999,328 | B2 | 2/2006 | Lin |
| 7,023,709 | B2 | 4/2006 | Lipcsei et al. |
| 7,057,611 | B2 | 6/2006 | Lin et al. |
| 7,061,183 | B1 | 6/2006 | Ball |
| 7,075,245 | B2 | 7/2006 | Liu |
| 7,095,392 | B2 | 8/2006 | Lin |
| 7,112,929 | B2 | 9/2006 | Chiou |
| 7,112,943 | B2 | 9/2006 | Bucur et al. |
| 7,120,035 | B2 | 10/2006 | Lin et al. |
| 7,126,289 | B2 | 10/2006 | Lin et al. |
| 7,141,933 | B2 | 11/2006 | Ball |
| 7,157,886 | B2 | 1/2007 | Agarwal et al. |
| 7,161,309 | B2 | 1/2007 | Chiou et al. |
| 7,173,382 | B2 | 2/2007 | Ball |
| 7,183,724 | B2 | 2/2007 | Ball |
| 7,183,727 | B2 | 2/2007 | Ferguson et al. |
| 7,187,139 | B2 | 3/2007 | Jin |
| 7,187,140 | B2 | 3/2007 | Ball |
| 7,190,123 | B2 | 3/2007 | Lee et al. |
| 7,200,017 | B2 | 4/2007 | Lin |
| 7,449,844 | B2 * | 11/2008 | Lev et al. .................... 315/291 |
| 2002/0180380 | A1 | 12/2002 | Lin |
| 2005/0030776 | A1 | 2/2005 | Lin |
| 2005/0093471 | A1 | 5/2005 | Jin |
| 2005/0093482 | A1 | 5/2005 | Ball |
| 2005/0093484 | A1 | 5/2005 | Ball |
| 2005/0151716 | A1 | 7/2005 | Lin |
| 2005/0174818 | A1 | 8/2005 | Lin et al. |
| 2005/0225261 | A1 | 10/2005 | Jin |
| 2006/0202635 | A1 | 9/2006 | Liu |
| 2006/0232222 | A1 | 10/2006 | Liu et al. |
| 2006/0279521 | A1 | 12/2006 | Lin |
| 2007/0001627 | A1 | 1/2007 | Lin et al. |
| 2007/0046217 | A1 | 3/2007 | Liu |
| 2007/0047276 | A1 | 3/2007 | Lin et al. |
| 2007/0085493 | A1 | 4/2007 | Kuo et al. |

* cited by examiner

METHOD AND CIRCUIT FOR SHORT-CIRCUIT AND OVER-CURRENT PROTECTION IN A DISCHARGE LAMP SYSTEM

TECHNICAL FIELD

The present invention relates to the driving of fluorescent lamps, and more particularly, protection methods and systems for driving cold cathode fluorescent lamps (CCFL), external electrode fluorescent lamps (EEFL), and flat fluorescent lamps (FFL). It is, but not exclusively, concerned with a circuit for driving one or more lamps which may be used for lighting a display.

BACKGROUND OF INVENTION

Short circuit protection is required in a discharge lamp inverter application for safety and reliability reasons. When a shorted lamp condition occurs, a protection circuit is needed to reduce the power level or shut down the circuit completely to avoid circuit breakdown or other possible catastrophic situations.

FIG. 1 shows a typical CCFL inverter where the lamp voltage can be as high as one thousand volts. For human safety, UL60950 standard requires that the current through a 2 KOhm resistor should be within the following range when any two points in the inverter board is shorted by the resistor. 2 KOhm is a typical resistance of a human body.

$$i_{2k} \le \begin{cases} 2\text{ mA, when current is DC,} \\ 0.7\text{ mA peak, when frequency} \le 1\text{ KHz,} \\ 0.7^{*}(\text{KHz})\text{ mA peak, when } 1\text{ KHz} < \text{frequency} < 100\text{ KHz,} \\ 70\text{ mA peak, when frequency} \ge 100\text{ KHz,} \end{cases}$$

FIG. 2 shows a prior art short-circuit protection method by sensing the inverter transformer's secondary winding current. An RC network, Rx and Cx, is added in series with the transformer's secondary winding to ground for sensing the transformer's secondary winding current. If the voltage drop of the RC network is larger than a threshold value, the short circuit protection is triggered. However, the RC network cannot pick up shorted current information when the transformer's secondary winding is shorted, such as at nodes Z and X. Another conventional method for short-circuit protection is to sense the duty cycle of the inverter. When the duty cycle is saturated and reaches its maximum value, the short-circuit protection is triggered. However, this method does not provide any direct information on the short-circuit condition.

An improved method is desired to detect a short-circuit condition even when the transformer's secondary winding is shorted and to trigger the short-circuit protection.

BRIEF DESCRIPTION OF DRAWINGS

The following figures illustrate embodiments of the invention. These figures and embodiments provide examples of the invention and they are non-limiting and non-exhaustive.

DETAILED DESCRIPTION

Embodiments of systems and methods for short circuit protection are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with systems, circuits, and methods that are meant to be exemplary and illustrative. In various embodiments, the above problem has been reduced or eliminated, while other embodiments are directed to other improvements.

The present invention relates to circuits and methods of short-circuit detection and protection in discharge lamp applications. The transformer's primary current is sensed and used to trigger the short-circuit protection. In accordance with the present invention, the circuits can achieve the short-circuit protection even when the transformer's secondary winding is shorted.

Figure 1:
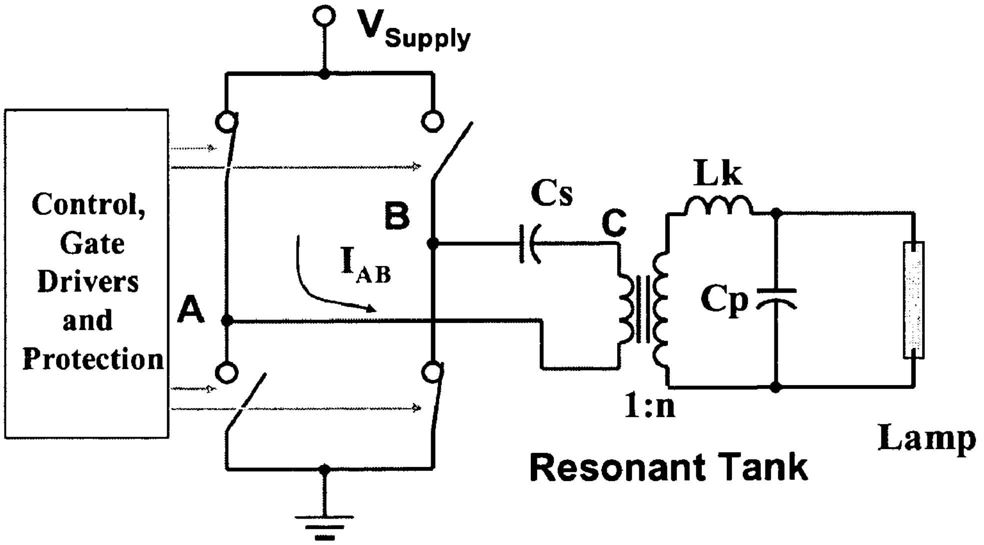
Fig. 1 (Prior Art)
FIG. 1 shows a prior art full-bridge CCFL inverter.
Figure 2:
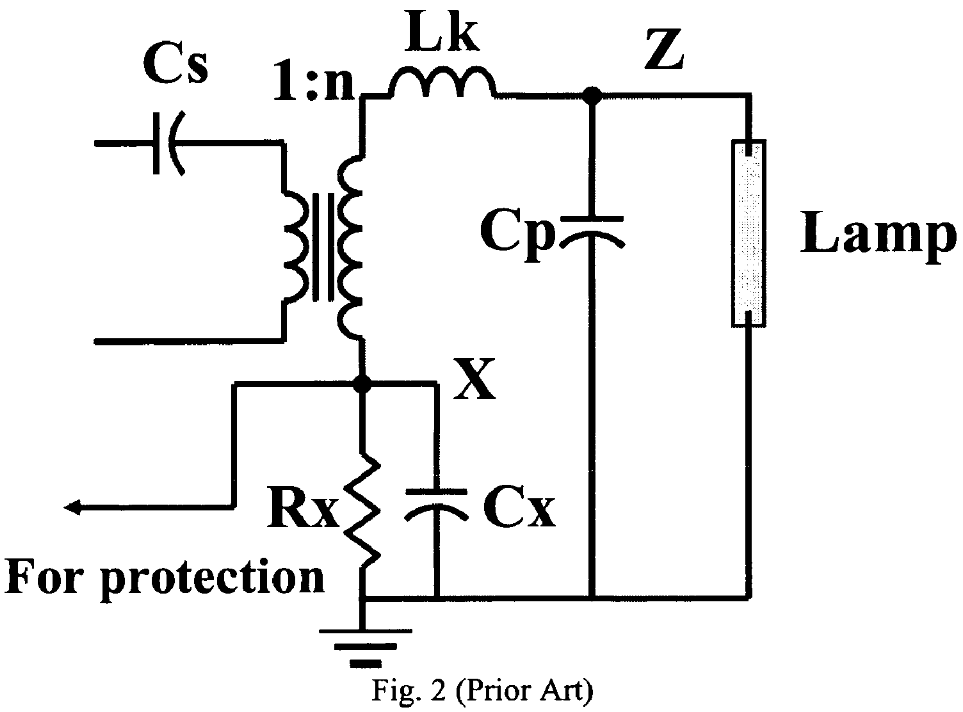
Fig. 2 (Prior Art)
FIG. 2 shows a prior art short-circuit protection method by sensing a transformer's secondary winding current.
Figure 3:
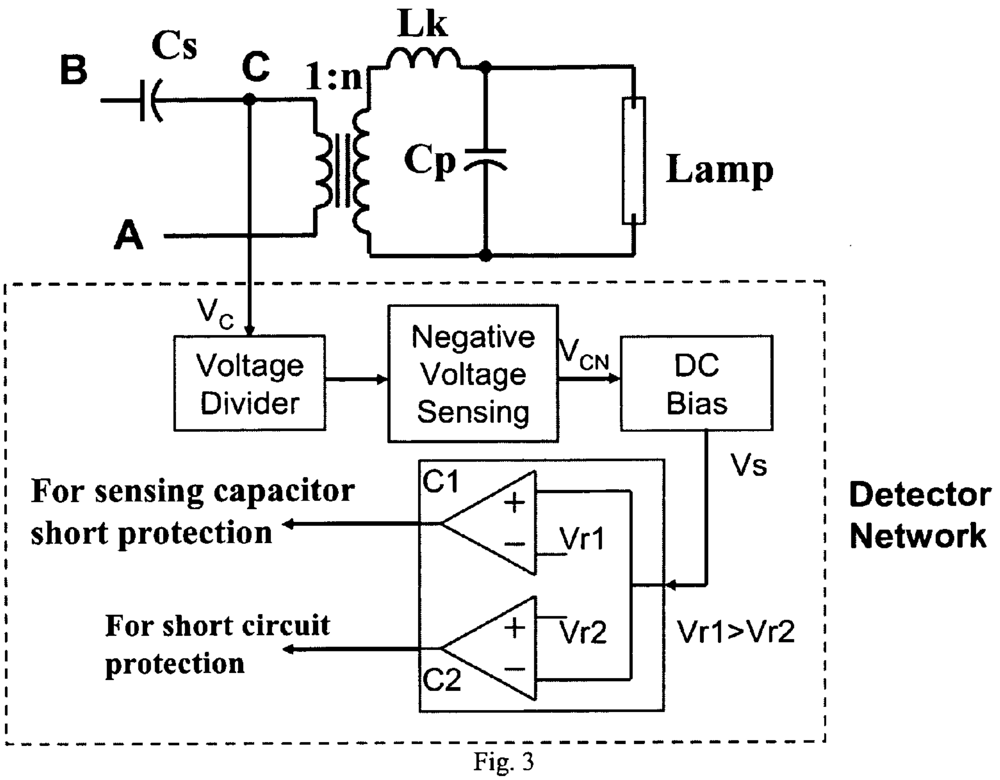
FIG. 3 illustrates a block diagram of the present invention.

FIG. 3 illustrates a block diagram of the present invention. In the circuit, the primary winding side includes a sensing capacitor Cs. Node C, coupled to the sensing capacitor, is used as a sensing node. The voltage $V_C$ at node C represents the sensing voltage of Cs and is used as an input signal to a detector network that comprises a voltage divider, a negative voltage sensing circuit, and a DC bias circuit. The voltage divider receives the voltage Vc and sends a modified sensing voltage Vc' to the negative voltage sensing circuit that provides the negative portion $V_{CN}$ of Vc' to the DC bias circuit. The DC bias circuit receives $V_{CN}$ and applies a DC bias voltage to $V_{CN}$ such that the combined voltage $V_S$ is always positive.

Figure 4:
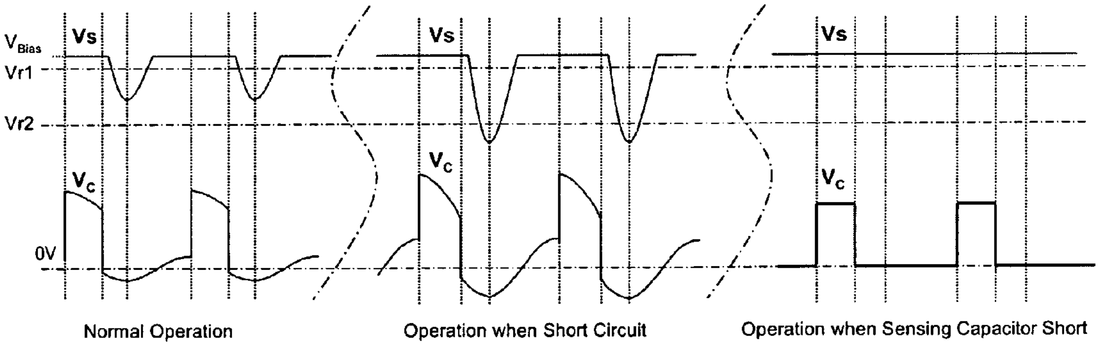
FIG. 4 illustrates some key operating waveforms of the circuit in FIG. 3.

Some key operating waveforms of the circuit in FIG. 3 are illustrated in FIG. 4. Vr1 and Vr2 are selected voltage values with Vr1>Vr2. Under normal operating conditions, the minimum value of $V_S$ is larger than Vr2 but smaller than Vr1. If a short-circuit condition occurs on the secondary winding side of the transformer, the minimum value of $V_S$ becomes smaller than the selected voltage value Vr2. If the sensing capacitor Cs is shorted, the minimum value of $V_S$ becomes larger than the selected voltage value Vr1. In fact, when the sensing capacitor Cs is shorted, $V_S$ is defined by the DC bias voltage since there is no negative portion in the sensing voltage Vc.

In one embodiment of the present invention, the minimum value of $V_S$ is used to detect a short-circuit condition of the transformer's secondary winding side and/or a Cs short condition. If the minimum value of $V_S$ is smaller than Vr2, it indicates a short circuit condition of the transformer's secondary winding side. If the minimum value of $V_S$ is larger than Vr1, it indicates a short sensing capacitor Cs condition.

In another embodiment of the present invention, $V_S$ is an input signal to the positive input terminal of a comparator C1 whose negative input terminal is coupled to Vr1. $V_S$ is also an input signal to the negative input terminal of another comparator C2 whose positive input terminal is coupled to Vr2. If the minimum value of $V_S$ is larger than Vr1, the output signal of C1 triggers a Cs short protection, and if the minimum value of $V_S$ is smaller than Vr2, the output signal of C2 triggers a short-circuit protection of the transformer's secondary winding side.

Figure 5:
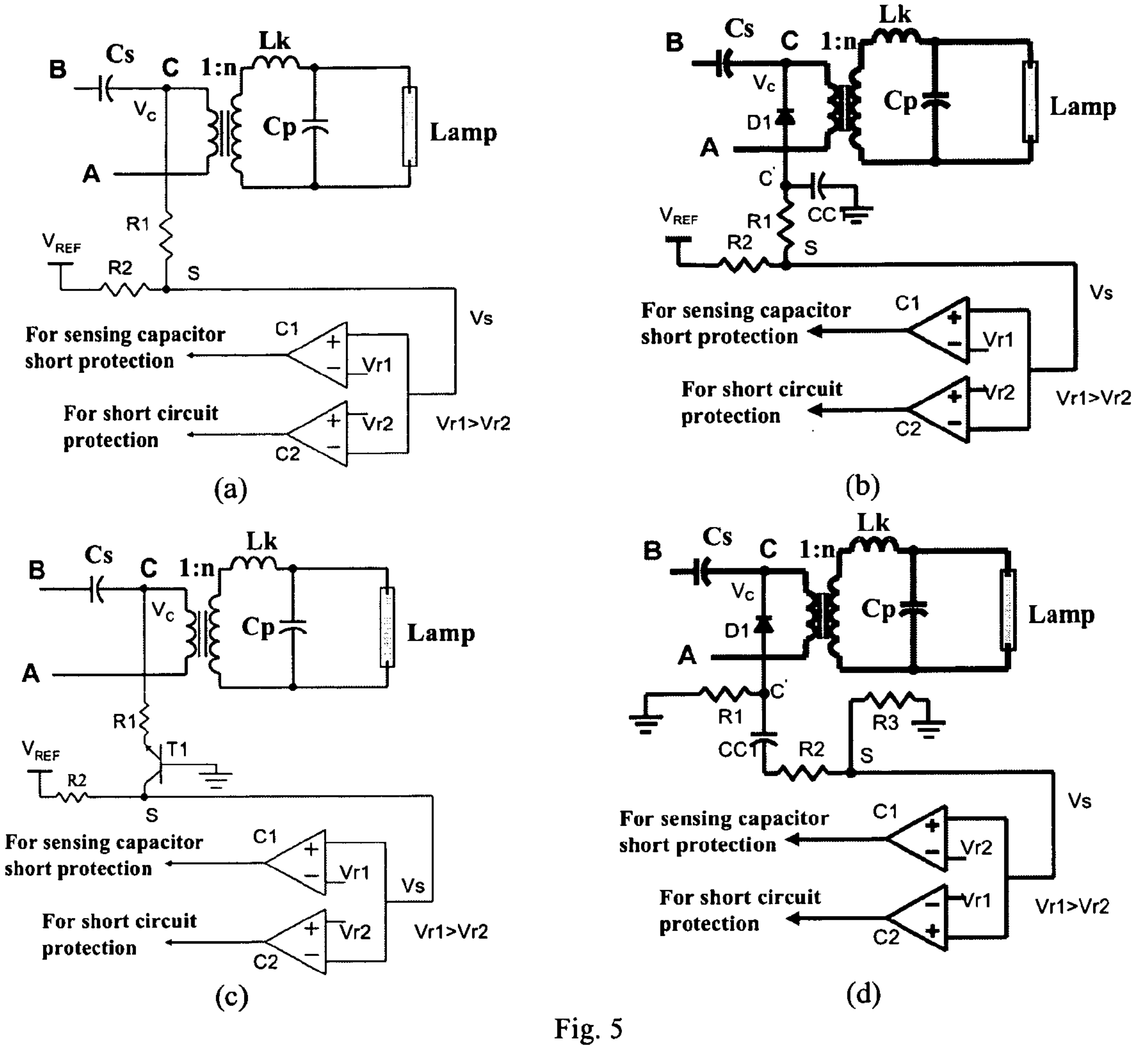
FIG. 5 illustrates embodiments of the present invention with discrete components.

FIG. 5(*a*), 5(*b*), 5(*c*), and 5(*d*) illustrate the embodiments of the present invention implemented with exemplary discrete components. In FIG. 5(*a*), the node C is coupled to a reference voltage $V_{REF}$ through resistors R1 and R2 in series. In this circuit, the DC bias is $V_{REF}$*R1/(R1+R2) while the Vc sensing factor of its negative part equals to R2/(R1+R2). In FIG. 5(*b*), the node C is coupled to a node C' through a diode D1. C' is grounded through a capacitor CC1 and is coupled to a reference voltage $V_{REF}$ through resistors R1 and R2 in series. Similar to FIG. 5(*a*), the DC bias is $V_{REF}$*R1/(R1+R2), while the Vc sensing factor of its negative part equals to R2/(R1+R2). In FIG. 5(*c*), the node C is coupled to the emitter of a transistor T1 through a resistor R1. T1's base is grounded and its collector is coupled to a reference voltage $V_{REF}$ through another resistor R2. In this circuit, the DC bias voltage is $V_{REF}$ while the Vc sensing factor of its negative part equals R2/R1.

The circuit in FIG. 5(*d*) does not include a DC bias circuit and is different from those in FIG. 5(*a*), 5(*b*) and 5(*c*). In FIG. 5(*d*), the node C is coupled to a node C' through a diode D1. C' is grounded through a resistor R1 and coupled to the node S through a capacitor CC1 and a resistor R2 in series. CC1 shifts the sensing voltage to an AC voltage. The node S is grounded through a resistor R3. The sensing factor of the AC voltage's negative peak value equals to R3/(R2+R3). In the circuit, a DC bias circuit is not required since the maximum voltage value of the shifted sensing voltage is above zero.

In FIG. 5(*a*), 5(*b*), and 5(*c*), if the minimum value of $V_S$ is larger than Vr1, the output signal of C1 triggers a Cs short protection; and if the minimum value of $V_S$ is smaller than Vr2, the output signal of C2 triggers a short-circuit protection of the secondary winding side.

In FIG. 5(*d*), if the maximum value of $V_S$ is larger than Vr1, the output signal of C2 triggers a short-circuit protection of the secondary winding side; and if the maximum value of $V_S$ is smaller than Vr2, the output signal of C1 triggers a Cs short protection. Thus, as seen above, various implementations are shown, but which are understood to be not exhaustive and the genus claims delineate the present invention.

Figure 6:
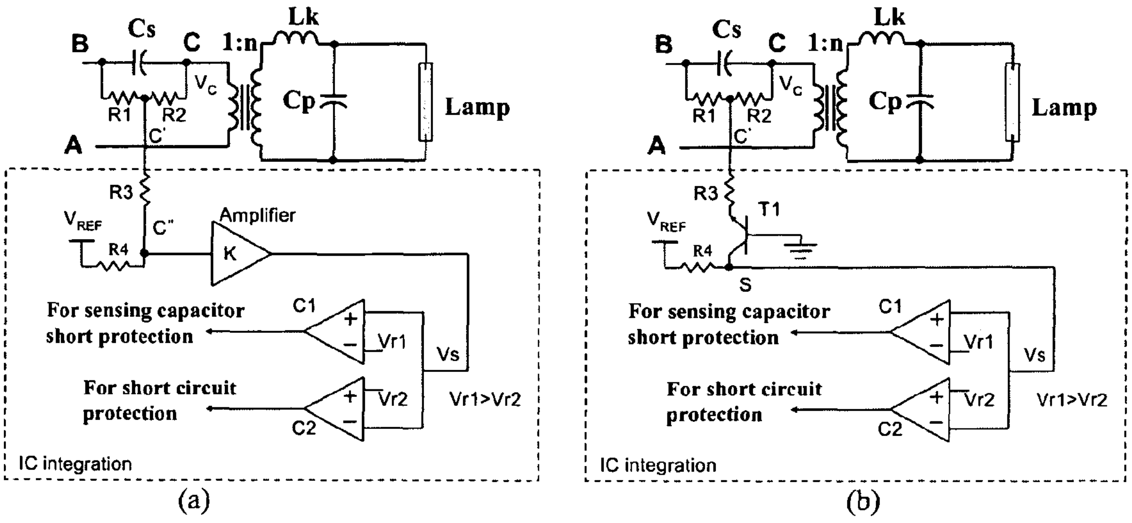
FIG. 6 illustrates embodiments of the present invention with integrated circuit (IC) integration.

FIGS. 6(*a*) and 6(*b*) illustrate embodiments of the present invention with IC integration where many of the components are integrated onto an IC. In both FIG. 6(*a*) and FIG. 6(*b*), the circuits comprise a voltage divider that contains resistors R1 and R2. The voltage divider is typically adjusted for different applications. R1 and R2 can be replaced by two capacitors in series. In an alternative connection, R1 can also be grounded instead of being connected to the node B. However, it requires more power dissipations in R1 and R2 with the alternative connection. Resistors R3 and R4 are built inside IC portion of the circuit and they have values significantly larger than R1 and R2. In FIG. 6(*a*), the node C is coupled to the node C' through the voltage divider. And, C' is coupled to a reference voltage $V_{REF}$ through resistors R1 and R2 in series. The voltage at the node C" is an input signal to an amplifier K that outputs a voltage signal $V_s$. In FIG. 6(*b*), the node C is coupled to the node C' through the voltage divider. C' is coupled to the emitter of a transistor Ti through a resistor R1. Ti's base is grounded and its collector is coupled to a reference voltage $V_{REF}$ through another resistor R2. In FIG. 6(*a*), the DC bias voltage is $V_{REF}$*R4/(R1+R2)*R4/(R3+R4) and the Vc sensing factor of its negative part is K*R1/(R1+R2)*R4/(R3+R4). In FIG. 6(*b*), the DC bias voltage is $V_{REF}$ and the Vc sensing factor of its negative part is R1/(R1+R2)*R4/R3.

In both FIG. 6(*a*) and 6(*b*), if the minimum value of $V_S$ is larger than Vr1, the output signal of C1 triggers a Cs short protection; and if the minimum value of $V_S$ is smaller than Vr2, the output signal of C2 triggers a short-circuit protection for the transformer's secondary winding side.

In the present invention, the voltage on the transformer's primary winding side or low-voltage side is used for the short-circuit detection of the transformer's secondary winding side or high voltage side. A sensing capacitor, located on the transformer primary winding side, is used to provide a sensing voltage to a detector network. In one embodiment of the present invention, the negative portion of the sensing voltage is sensed and then biased to produce a positive voltage by a DC bias circuit. The minimum value of the biased positive voltage is then used to detect the short-circuit condition and/or the sensing-capacitor-short condition. In another embodiment of the present invention, the negative portion of the sensing voltage is sensed and then coupled through another sensing capacitor to produce an AC output signal. The maximum value of the AC output signal is positive and is used to detect the short-circuit condition of the transformer's high-voltage side and/or the sensing-capacitor-short condition. In another embodiment of the present invention, a voltage divider is applied across the sensing capacitor or coupled between one end of the sensing capacitor and ground so that similar negative peak values of the sensing voltage can be obtained in circuits with different sensing capacitor values.

The description of the invention and its applications as set forth herein is illustrative short-circuit protection and is not intended to limit the scope of the invention. Variations and modifications of the embodiments disclosed herein are possible, and practical alternatives to and equivalents of the various elements of the embodiments are known to those of ordinary skill in the art. Other variations and modifications of the embodiments disclosed herein may be made without departing from the scope and spirit of the invention.

We claim:

1. A method for detecting a short-circuit condition in a discharge lamp system, comprising:

providing a sensing voltage to a detector network from a sensing capacitor in serial with the primary winding side of the system;

applying a DC bias voltage to said sensing voltage and deriving a detecting voltage signal, wherein the minimum value of said detecting voltage signal is above zero; and using the minimum value of said detecting voltage signal to determine whether a short-circuit condition exists;

wherein a short-sensing-capacitor condition is detected if the minimum value of said detecting voltage signal is larger than a first reference voltage, and a short-circuit condition is detected if the minimum value of said detecting voltage signal is smaller than a second reference voltage, said first reference voltage is larger than said second reference voltage and the minimum value of said detecting voltage signal is larger than said second reference voltage but smaller than said first reference voltage under normal operation conditions.

2. The method in claim 1, wherein said detecting voltage signal is connected to an input terminal of a first comparator having its other input terminal being connected to said first reference voltage, said detecting voltage signal also connected to an input terminal of a second comparator having its other input terminal being connected to said second reference voltage, and if the minimum value of said detecting voltage signal is larger than said first reference voltage, said first comparator sends an output signal to trigger a short-sensing-capacitor condition; and if the minimum value of said detecting voltage signal is smaller than said second reference voltage, said second comparator sends another output signal to trigger a short-circuit condition.

3. The method in claim 1, wherein said detector network comprises a voltage divider that is coupled between one end of said sensing capacitor and the other end of said sensing capacitor or ground, and said voltage divider provides said sensing voltage.

4. The method in claim 3, wherein said voltage divider comprises two resistors in series or two capacitors in series.

5. A method for detecting a short-circuit condition in a discharge lamp system, comprising:

providing a sensing voltage to a detector network from a sensing capacitor in serial with the primary winding side of the system, wherein said detector network includes a negative-voltage sensing circuit and a DC bias circuit;

sensing the negative portion of said sensing voltage through said negative-voltage-sensing circuit;

applying a DC bias voltage from said DC bias circuit to the negative portion of said sensing voltage and deriving a detecting voltage signal, wherein the minimum value of said detecting voltage signal is above zero; and using the minimum value of said detecting voltage signal to determine whether a short-circuit condition exists;

wherein a short-sensing-capacitor condition is detected if the minimum value of said detecting voltage signal is larger than a first reference voltage, and a short-circuit condition is detected if the minimum value of said detecting voltage signal is smaller than a second reference voltage, said first reference voltage is larger than said second reference voltage and the minimum value of said detecting voltage signal is larger than said second reference voltage but smaller than said first reference voltage under normal operation conditions.

6. The method in claim 5, wherein said negative-voltage-sensing circuit comprises a diode.

7. The method in claim 5, wherein said detecting voltage signal is connected to an input terminal of a first comparator having its other input terminal being connected to said first reference voltage, said detecting voltage signal also connected to an input terminal of a second comparator having its other input terminal being connected to said second reference voltage, and if the minimum value of said detecting voltage signal is larger than said first reference voltage, said first comparator sends an output signal to trigger a short-sensing-capacitor condition; and if the minimum value of said detecting voltage signal is smaller than said second reference voltage, said second comparator sends another output signal to trigger a short-circuit condition.

8. The method in claim 5, wherein said detector network further comprises a voltage divider that is coupled between one end of said sensing capacitor and the other end of said sensing capacitor or ground, and said voltage divider provides said sensing voltage.

9. The method in claim 8, wherein said voltage divider comprises two resistors in series or two capacitors in series.

10. A method for detecting a short-circuit condition in a discharge lamp system, comprising:

providing a sensing voltage to a detector network from a sensing capacitor in serial with the primary winding side of the system, wherein said detector network comprises a negative-voltage-sensing circuit and a second capacitor;

sensing the negative portion of said sensing voltage through said negative-voltage-sensing circuit;

coupling said negative portion of said sensing voltage to said second capacitor and deriving a detecting voltage signal; and using the maximum value of said detecting voltage signal to determine whether a short-circuit condition exists;

wherein a short-circuit condition is detected if the maximum value of said detecting voltage signal is larger than a first reference voltage, and a short-sensing-capacitor condition is detected if the maximum value of said detecting voltage signal is smaller than a second reference voltage, said first reference voltage is larger than said second reference voltage and the maximum value of said detecting voltage signal is larger than said second reference voltage but smaller than said first reference voltage under normal operation conditions.

11. The method in claim 10, wherein said detecting voltage signal is connected to an input terminal of a first comparator having its other input terminal being connected to said first reference voltage, said detecting voltage signal also connected to an input terminal of a second comparator having its other input terminal being connected to said second reference voltage, and if the maximum value of said detecting voltage signal is larger than said first reference voltage, said first comparator sends an output signal to trigger a short-circuit condition; and if the maximum value of said detecting voltage signal is smaller than said second reference voltage, said second comparator sends another output signal to trigger a short-sensing-capacitor condition.

12. The method in claim 10, wherein said detector network further comprises a voltage divider that is coupled between one end of said sensing capacitor and the other end of said sensing capacitor or ground, and said voltage divider provides said sensing voltage.

13. The method in claim 12, wherein said voltage divider contains two resistors in series or two capacitors in series.

14. A system capable of detecting a short-circuit condition, and triggering a short-circuit protection in a discharge lamp system, comprising:

a sensing capacitor in serial with the primary winding side; and a detector network that comprises a DC bias circuit to receive a sensing voltage signal from said sensing capacitor, apply a DC bias voltage to said sensing voltage, derive a detecting voltage signal, and use the minimum value of said detecting voltage signal to determine whether a short-circuit condition exists, wherein the minimum value of said detecting voltage signal is above zero;

wherein said detector network detects a short-sensing-capacitor condition if the minimum value of said detecting voltage signal is larger than a first reference voltage, and detects a short-circuit condition if the minimum value of said detecting voltage signal is smaller than a second reference voltage, said first reference voltage is larger than said second reference voltage and the minimum value of said detecting voltage signal is larger than said second reference voltage but smaller than said first reference voltage under normal operation conditions.

15. The system in claim 14, wherein said detecting voltage signal is connected to an input terminal of a first comparator having its other input terminal being connected to said first reference voltage, said detecting voltage signal also connected to an input terminal of a second comparator having its other input terminal being connected to said second reference voltage, and if the minimum value of said detecting voltage signal is larger than said first reference voltage, said first comparator sends an output signal to trigger a short-sensing-capacitor condition; and if the minimum value of said detecting voltage signal is smaller than said second reference voltage, said second comparator sends another output signal to trigger a short-circuit condition.

16. The system in claim 14, wherein said detector network further comprises a voltage divider that is coupled between one end of said sensing capacitor and the other end of said sensing capacitor or ground, and said voltage divider provides said sensing voltage.

17. The system in claim 16, wherein said voltage divider comprises two resistors in series or two capacitors in series.

18. A system capable of detecting a short-circuit condition, and triggering a short-circuit protection in a discharge lamp system, comprising:

a sensing capacitor in serial with the primary winding side; and a detector network that comprises a negative-voltage-sensing circuit and a DC bias circuit to receive a sensing voltage signal from said sensing capacitor, subtract the negative portion of said sensing voltage through said negative-voltage-sensing circuit, apply a DC bias voltage from said DC bias circuit to the negative portion of said sensing voltage, derive a detecting voltage signal, and use the minimum value of said detecting voltage signal to determine whether a short-circuit condition exists, wherein the minimum value of said detecting voltage signal is above zero;

wherein said detector network detects a short-sensing-capacitor condition if the minimum value of said detecting voltage signal is larger than a first reference voltage, and detects a short-circuit condition if the minimum value of said detecting voltage signal is smaller than a second reference voltage, said first reference voltage is larger than said second reference voltage and the minimum value of said detecting voltage signal is larger than said second reference voltage but smaller than said first reference voltage under normal operation conditions.

19. The system in claim 18, wherein said negative-voltage-sensing circuit comprises a diode.

20. The system in claim 18, wherein said detecting voltage signal is connected to an input terminal of a first comparator having its other input terminal being connected to said first reference voltage, said detecting voltage signal also connected to an input terminal of a second comparator having its other input terminal being connected to said second reference voltage, and if the minimum value of said detecting voltage signal is larger than said first reference voltage, said first comparator sends an output signal to trigger a short-sensing-capacitor condition; and if the minimum value of said detecting voltage signal is smaller than said second reference voltage, said second comparator sends another output signal to trigger a short-circuit condition.

21. The system in claim 18, wherein said detector network further comprises a voltage divider that is coupled between one end of said sensing capacitor and the other end of said sensing capacitor or ground, and said voltage divider provides said sensing voltage.

22. The system in claim 21, wherein said voltage divider comprises two resistors in series or two capacitors in series.

23. A system capable of detecting a short-circuit condition, and triggering a short-circuit protection in a discharge lamp system, comprising:

a sensing capacitor in serial with the primary winding side; and a detector network that comprises a negative-voltage-sensing circuit and a second capacitor to receive a sensing voltage signal from said sensing capacitor, subtract the negative portion of said sensing voltage through said negative-voltage-sensing circuit, couple the negative portion of said sensing voltage through said second capacitor to derive a detecting voltage signal, and use the maximum value of said detecting voltage signal to determine whether a short-circuit condition exists;

wherein said detector network detects a short-circuit condition if the maximum value of said detecting voltage signal is larger than a first reference voltage, and detects a short-sensing-capacitor condition if the maximum value of said detecting voltage signal is smaller than a second reference voltage, said first reference voltage is larger than said second reference voltage and the maximum value of said detecting voltage signal is larger than said second reference voltage but smaller than said first reference voltage under normal operation conditions.

24. The system in claim 23, wherein said detecting voltage signal is connected to an input terminal of a first comparator having its other input terminal being connected to said first reference voltage, said detecting voltage signal also connected to an input terminal of a second comparator having its other input terminal being connected to said second reference voltage, and if the maximum value of said detecting voltage signal is larger than said first reference voltage, said first comparator sends an output signal to trigger a short-circuit condition; and if the maximum value of said detecting voltage signal is smaller than said second reference voltage, said second comparator sends another output signal to trigger a short-sensing-capacitor condition.

25. The system in claim 23, wherein said detector network further comprises a voltage divider that is coupled between one end of said sensing capacitor and the other end of said sensing capacitor or ground, and said voltage divider provides said sensing voltage.

26. The system in claim 25, wherein said voltage divider contains two resistors in series or two capacitors in series.

* * * * *